US008549636B2

(12) United States Patent
Nakai

(10) Patent No.: US 8,549,636 B2
(45) Date of Patent: Oct. 1, 2013

(54) INFORMATION PROCESSING APPARATUS, AUTHENTICATION METHOD, AND COMPUTER PROGRAM

(75) Inventor: Yuki Nakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/439,616

(22) Filed: Apr. 4, 2012

(65) Prior Publication Data

US 2012/0260334 A1     Oct. 11, 2012

(30) Foreign Application Priority Data

Apr. 8, 2011   (JP) ................................. 2011-086612

(51) Int. Cl.
*G06F 7/04* (2006.01)
*G06F 11/00* (2006.01)
*G06F 9/00* (2006.01)
*H04L 29/06* (2006.01)

(52) U.S. Cl.
USPC ....... 726/22; 726/21; 726/26; 713/2; 713/161

(58) Field of Classification Search
USPC ......................................... 726/20, 21, 22, 26
See application file for complete search history.

(56) References Cited

U.S. PATENT DOCUMENTS

| 2004/0215278 | A1* | 10/2004 | Stegink et al. ................. 607/30 |
| 2005/0005286 | A1* | 1/2005 | Koskela et al. ................. 725/31 |
| 2009/0178118 | A1* | 7/2009 | Cedo Perpinya et al. ......... 726/3 |
| 2010/0284033 | A1* | 11/2010 | Popovic et al. .............. 358/1.15 |

FOREIGN PATENT DOCUMENTS

JP      2010-61611     3/2010

* cited by examiner

*Primary Examiner* — Mohammad W Reza
(74) *Attorney, Agent, or Firm* — Frommer Lawrence & Haug LLP; William S. Frommer

(57) ABSTRACT

An information processing apparatus includes: a software storing unit that stores software; a storage recognizing unit that recognizes, when a storage having stored therein first authentication information for enabling a function of the software stored in the software storing unit is connected to the information processing apparatus via an interface unit, that the storage is connected and transmits second authentication information uniquely corresponding to the function of the software to be enabled to the storage; and a function managing unit that enables, when the first authentication information and the second authentication information compared by the storage coincide with each other, the function of the software on the basis of a notification informing that the first authentication information and the second authentication information coincide with each other issued by the storage, the storage deleting the first authentication information.

6 Claims, 3 Drawing Sheets

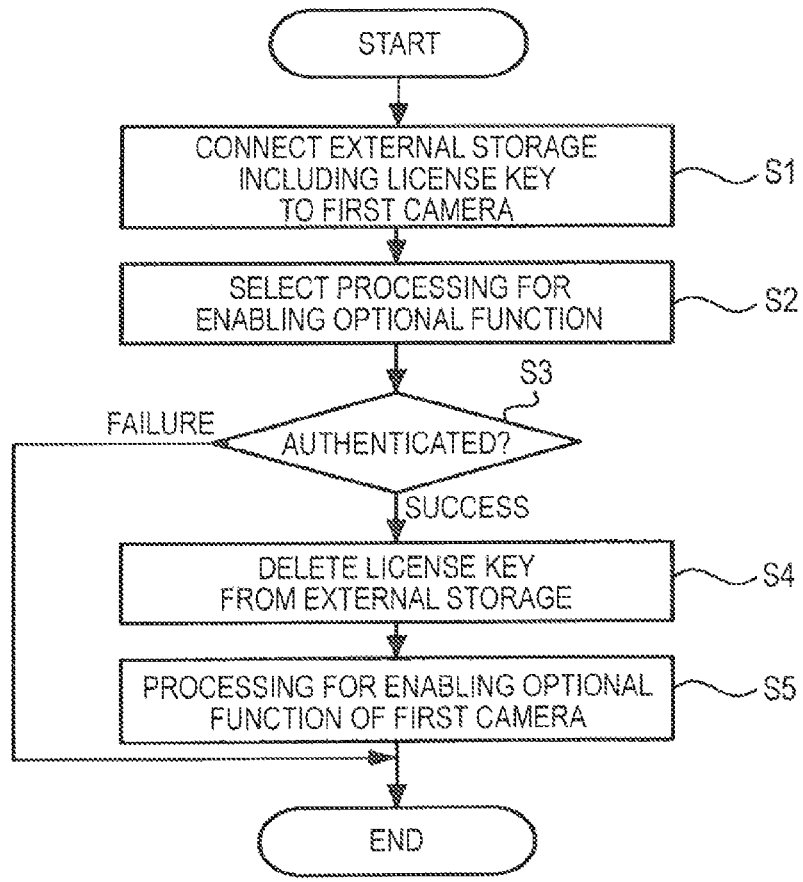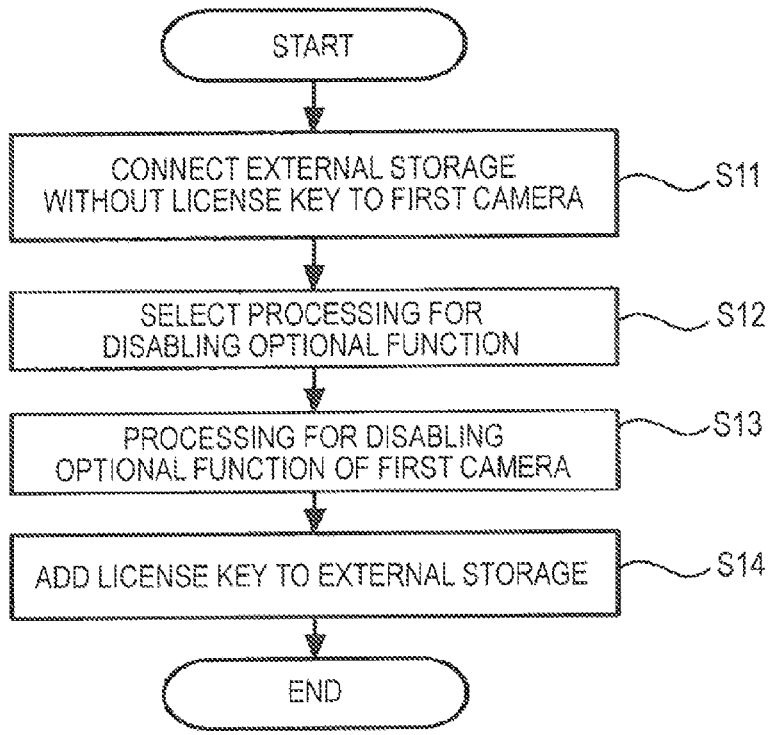

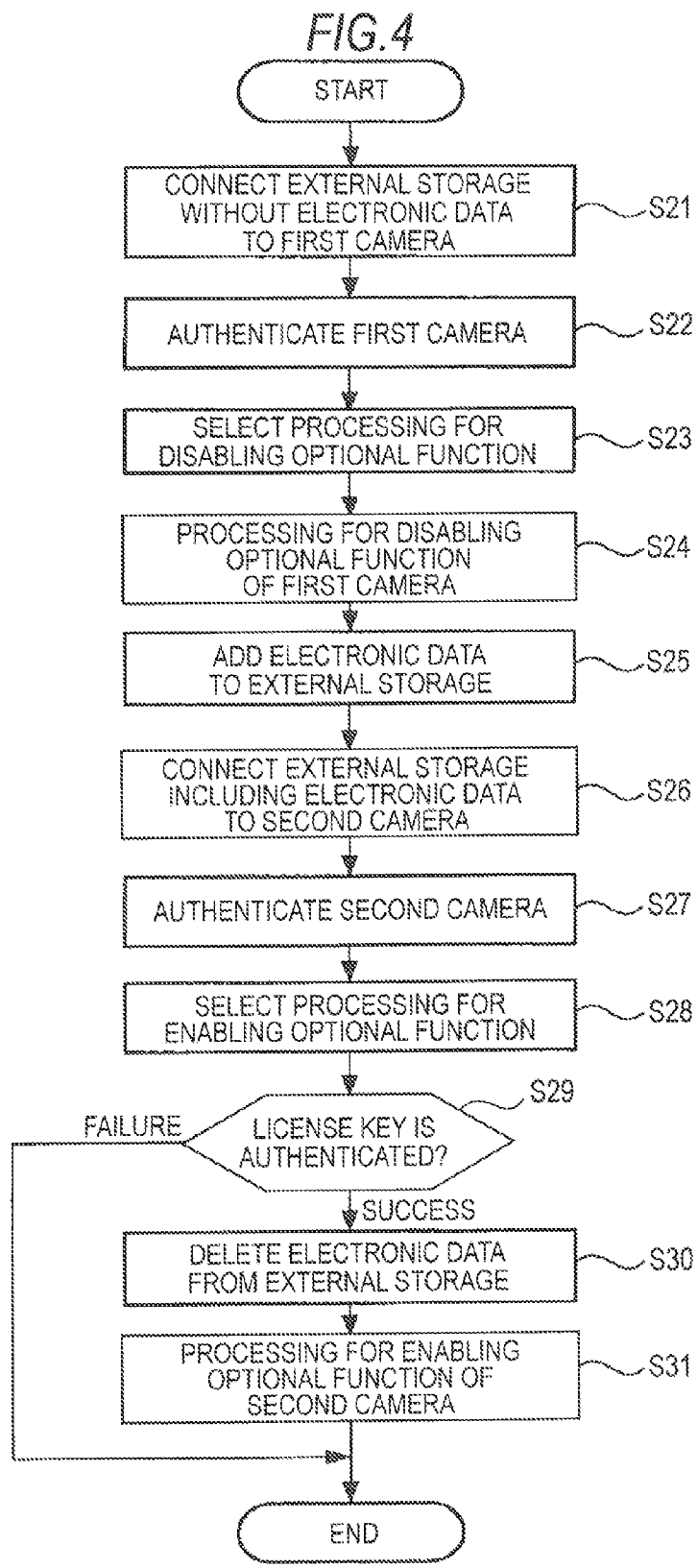

INFORMATION PROCESSING APPARATUS, AUTHENTICATION METHOD, AND COMPUTER PROGRAM

FIELD

The present disclosure relates to an information processing apparatus, an authentication method, and a computer program. The present disclosure relates to, for example, a technique for enabling or disabling an optional function of a software program (hereinafter referred to as "software") provided in the information processing apparatus.

BACKGROUND

In the past, when a user uses a software program in an information processing apparatus such as a personal computer apparatus or an imaging apparatus, the user needs to obtain permission to use from a manufacturer of the software. However, there are a large number of users who request the use of the software. Therefore, the manufacturer adopts a method of informing a user having purchased the software of authentication information and permitting the use of the software only when the authentication information is input, for example, during installation of the software. A serial number different for each product formed by combining plural alphanumeric characters is affixed to a license key generally used as the authentication information. The license key is affixed to, for example, a case in which an optical disk or the like having the software recorded therein is stored. Only the user having purchased the software can acquire the license key.

In recent years, arithmetic functions of information processing apparatuses are improved and storage capacities of memories and the like in which software is installed are increased. Therefore, even one information processing apparatus can use various functions. However, in some case, a manufacture ships the information processing apparatus while providing a part of the functions implemented in the information processing apparatus as a use-limited optional function and keeping allowing only a main function other than the optional function to be used to hold down installation expenses for the information processing apparatus on a user side. In this case, the user separately purchases a license key for the optional function, obtains permission to use the optional function, and enables the optional function.

In order to use an optional function, a specific information processing apparatus (in the following explanation, the information processing apparatus is a camera) adopts a method of causing a hard key device (hereinafter referred to as "hard key") formed in a special shape to store a license key and causing a user to obtain permission to use the optional function using the hard key. In this method, when the camera reads out the license key from the hard key inserted into a specific adapter and it is authenticated that the license key is a license key issued to a regular user, the information processing apparatus can use the optional function. Since the hard key is formed in the special shape as explained above, the hard key may be unable to be inserted into a general personal computer apparatus not including the special adapter. An information processing apparatus other than the camera may be unable to read out the license key.

JP-A-2010-61611 discloses a technique for prohibiting an image forming apparatus having printed a license key on paper from executing software for which permission to use is necessary and permitting use of the software by another apparatus to which the license key is inputted.

SUMMARY

To insert the hard key having the special shape into the camera and permit use of the optional function, it is necessary to once disassemble the camera carried into an exclusive facility (a service center, etc.) and insert the hard key into the adapter on the inside of the camera. Alternatively, a service provider provides a service for visiting the location of the user and inserting the hard key into the camera. When the hard key having the special shape is used, time and labor for inserting the hard key into the camera are consumed. Further, when the camera is disassembled to insert the hard key, it is likely that a tool or the like touches an exposed internal mechanism and affects the operation of the camera.

In the technique disclosed in JP-A-2010-61611, since the license key is printed on paper, the optional function originally permitted to only one camera can be used in plural cameras. Therefore, it is difficult to manage, with respect to the number of license keys, the number of cameras for which the optional function is actually enabled.

Therefore, it is desirable to surely perform management of software permitted to be used.

According to an embodiment of the present disclosure, when a storage having stored therein first authentication information for enabling a function of software stored in a software storing unit is connected to an information processing apparatus via an interface the information processing apparatus recognizes the connection of the storage. Subsequently, the information processing apparatus transmits second authentication information uniquely corresponding to the function of the software to be enabled to the storage.

When the first authentication information and the second authentication information compared by the storage coincide with each other, the storage deletes the first authentication information. The information processing apparatus enables the function of the software on the basis of a notification issued by the storage to inform that the first authentication information and the second authentication information coincide with each other.

Consequently, it is possible to enable the function of the software on the basis of the notification of the storage when the first authentication information and the second authentication information coincide with each other.

According to the embodiment of the present disclosure, when the storage having stored therein the first authentication information is connected to the information processing apparatus and the second authentication information stored in the software storing unit coincides with the first authentication information, the information processing apparatus enables the function of the software. At this point, since the storage deletes the first authentication information, even if the storage is connected to another information processing apparatus, the function of the software may be unable to be enabled in the other information processing apparatus. Therefore, it is possible to surely perform management of the software that is permitted to be used and enabled.

BRIEF DESCRIPTION OF THE DRAWINGS

FIG. 2 is a flowchart for explaining a processing example in enabling an optional function according to the first embodiment of the present disclosure;

FIG. 3 is a flowchart for explaining a processing example in disabling the optional function according to the first embodiment; and FIG. 4 is a flowchart for explaining a processing example in shifting an optional function using electronic data according to a second embodiment of the present disclosure.

DETAILED DESCRIPTION

Figure 1:
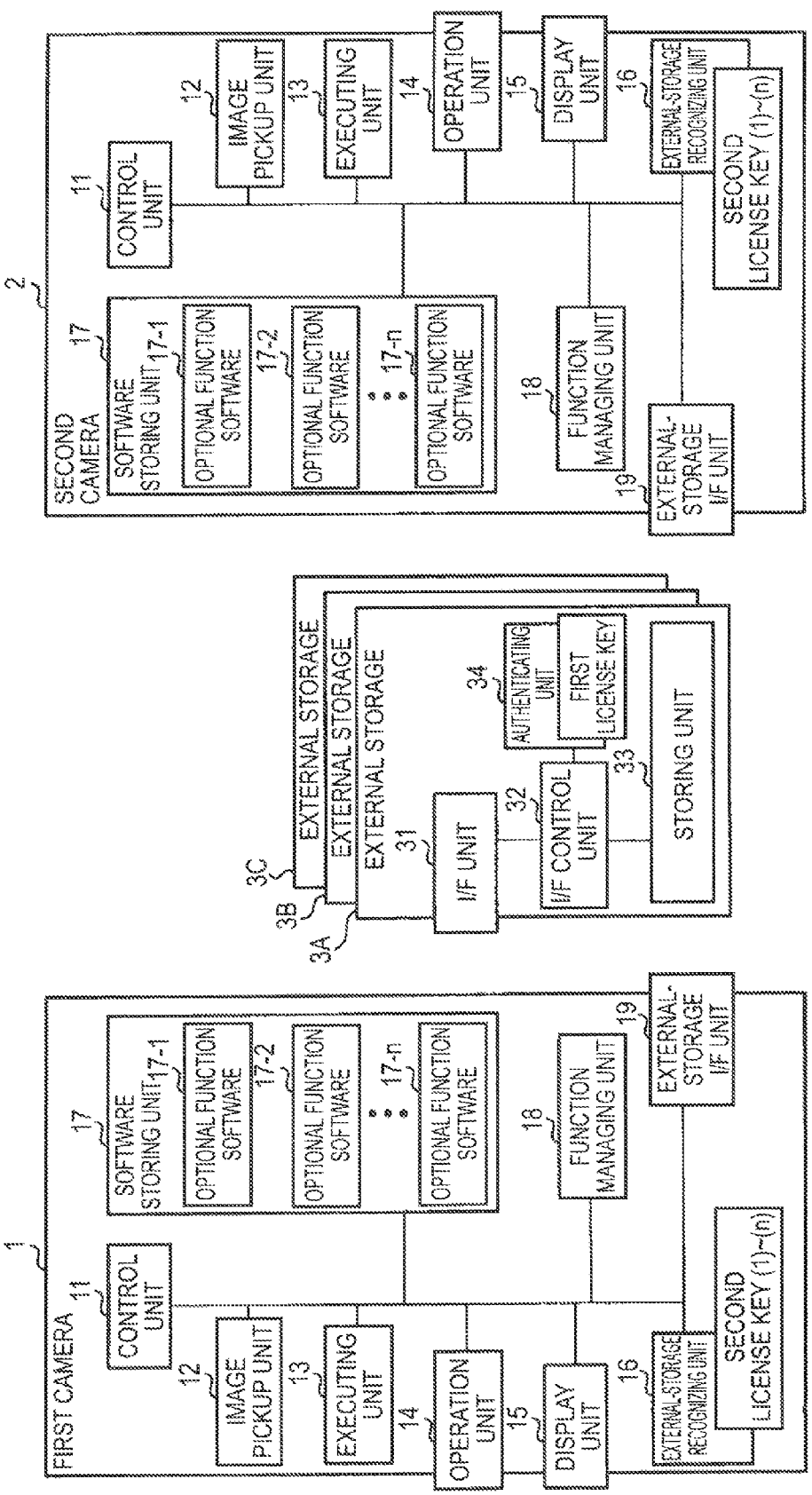
FIG. 1 is a block diagram of internal configuration examples of a first and second cameras and an external storage according to a first embodiment of the present disclosure.

Embodiments of the present disclosure (hereinafter referred to as embodiments) are explained below. The explanation is performed in order described below.

1. First Embodiment (license management; an example in which an optional function is enabled using first and second license keys)

2. Second Embodiment (license management; an example in which an optional function is shifted using electronic data)

3. Modifications

1. First Embodiment

An Example in, which an Optional Function is Enabled Using First and Second License Keys A first embodiment of the present disclosure (hereinafter referred to as "this embodiment") is explained with reference to FIGS. 1 to 3.

In this embodiment, in order to enable or disable an optional function realized by optional function software, a first license key managed by external storages 3A to 3C functioning as removable storages is used. The external storages 3A to 3C are completely the same as hardware but store different kinds of information of the first license key. A first camera 1 and a second camera 2 are used, as information processing apparatuses that execute the optional function to be enabled or disabled. The first camera 1 and the second camera 2 respectively execute computer programs to thereby realize an authentication method performed by internal blocks in cooperation with one another. The first and second cameras 1 and 2 and the external storages 3A to 3C use the first license key and a second license key as authentication information for enabling functions of software. As the optional function, software, for example, there is a computer program for allowing processing for changing an output system for a video signal and performing processing while synchronizing the first camera 1 and the second camera 2.

FIG. 1 is a block diagram of internal configuration examples of the first and second cameras 1 and 2 and the external storages 3A to 3C.

The first camera 1 and the second camera 2 have the same functional blocks. Therefore, details of the functional blocks are explained as an internal configuration example of the first camera 1 with reference to FIG. 1. Redundant explanation is omitted concerning the functional blocks of the second camera 2 corresponding to the first camera 1.

The first camera 1 includes a control unit 11 that controls the operations of units, an image pickup unit 12 that includes optical systems such as a lens and an image pickup device and picks up an image of a subject and outputs digital video data, and an executing unit 13 that executes functions of enabled various kinds of software. The executing unit 13 can also execute main functions of computer programs for which authentication is unnecessary.

The first camera 1 includes an operation unit 14 that manages an operation input from a user and a display unit 15 that displays, for example, a display screen for selecting whether an optional function is enabled or disabled. The operation unit 14 includes switches such as a power button and operation buttons provided on a housing of the first camera 1. On the display unit 15, a menu screen such as a graphical user interface (GUI) is displayed. The display unit 15 may be combined with the operation unit 14 to configure a touch panel display and allow the user to perform a touch input to a screen.

The first camera 1 includes a software storing unit 17 that stores plural kinds (n kinds) of optional function software 17-1 to 17-n. However, unless these kinds of optional function software 17-1 to 17-n are authenticated using the first license key stored in an authenticating unit 34 of the external storage 3A, it may be impossible to enable functions and allow the executing unit 13 to execute the optional function software.

The first camera 1 includes an external-storage recognizing unit 16 that transmits, when the external storage 3A connected to the first camera 1 has the first license key, the second license key to the external storage 3A and performs authentication for enabling functions of the optional function software. The external-storage recognizing unit 16 is used as a storage recognizing unit that authenticates the first license key stored by the external storage 3A. When the external storage 3A is connected to the first camera 1 via an external-storage interface unit 19, the external-storage recognizing unit 16 recognizes that the external storage 3A is connected. The external storage 3A stores the first license key for enabling the functions of the software stored in the software storing unit 17. The external-storage recognizing unit 16 transmits the second license key uniquely corresponding to an optional function to be enabled to the external storage 3A.

The first camera 1 includes a function managing unit 18 that manages information concerning whether an optional function is enabled or disabled and the external-storage interface unit 19 that manages communication of data performed between, the first camera 1 and the external storage 3A connected to a not-shown connecting unit. When the first and second license keys compared by the external storage 3A coincide with each other, the external storage 3A deletes the first license key stored by the authenticating unit 34. Thereafter, the function managing unit 18 enables the functions of the software on the basis of a notification issued by the external storage 3A to inform that, the first and second license keys coincide with each other.

The external-storage recognizing unit 16 has different second license keys (1) to (n) for the respective kinds of optional function software 17-1 to 17-n. The external-storage recognizing unit 16 transmits, to the external storage 3A, the second license key of the software selected by an operation input to the operation unit 14 and receives permission to use using the first license key stored by the external storage 3A. The second license key (1) is associated with the first license key stored by the external storage 3A in a one-to-one relation. Similarly, the second license keys (2) to (n) are associated, in a one-to-one relation, with the first license keys respectively stored in the external storages 3B, 3C, and the like.

On the other hand, the external storage 3A includes an interface unit 31 that manages communication of data performed between the external storage 3A and the first camera 1 when the interface unit 31 is connected to a not-shown connecting unit of the external-storage interface unit 19 of the first camera 1. Further, the external storage 3A includes an interface control unit 32 that controls communication of data performed between the interface unit 31 and a storing unit 33.

When the first license key is stored in the storing unit 33, the interface control unit 32 prohibits the communication of data performed between the interface unit 31 and the storing unit 33. Therefore, no data is written in the storing unit 33.

The external storage 3A includes an authenticating unit 34 that manages the first license key stored in the storing unit 33. When the second license key received from the first camera 1 coincides with the first license key stored in the recognizing unit 34, the authenticating unit 34 recognizes that optional function software for executing an optional function to be enabled is present in the first camera 1. The authenticating unit 34 notifies the first camera 1 whether authentication for the optional function is successful.

A storage formed according to general-purpose standards is used as the external storage 3A. The external storage 3A is easily connected to and disconnected from the connecting unit of the first camera 1. As the external storage 3A in this embodiment, for example, a card-type semiconductor storage conforming to a communication standard for allowing high-speed transfer of data such as Express Card (registered trademark) is used. The first license key for enabling one kind of an optional function is stored in the external storage 3A. Plural external storages are necessary for respective optional functions to be enabled. Therefore, for example, in order to enable three kinds of optional functions, the external storages 3A to 3C have to be used.

When the second license key received from the external-storage recognizing unit 16 coincides with the first license key, the external storage 3A deletes the first license key. At this point, the external storage 3A performs, according to the deletion of the first license key, control for allowing readout of data from or writing of data in a storage area of the external storage 3A. As a result, the executing unit 13 of the first camera 1 can read out data from or write data in the external storage 3A from which the first license key is deleted. On the other hand, when the second license key and the first license key do not coincide with each other, the external storage 3A performs processing explained below. When the first license key is not deleted from the external storage 3A and is stored in the external storage 3A, the external storage 3A performs control for disallowing readout of data from or writing of data in the storage area of the storing unit 33 performed by the first camera 1.

At this point, since the first license key is deleted from the external storage 3A, the external storage 3A can be connected to the second camera 2 and the second camera 2 can read out data from or write data in the external storage 3A. In this case, the second camera 2 may be unable to execute optional function software enabled by the first license key.

Processing examples in enabling or disabling an optional function is explained with reference to FIGS. 2 and 3. Processing examples of the first camera 1 and the external storage 3A are explained with reference to FIGS. 2 and 3. Explanation of processing is omitted concerning the second camera 2 that performs processing same as the processing of the first camera 1.

[Enabling an Optional Function]

FIG. 2 is a flowchart for explaining a processing example in enabling an optional function.

(Preconditions)

As a premise of this processing, it is assumed that the first license key associated with an optional function to be enabled is stored in the external storage 3A. It is assumed that the first license key stored in the authenticating unit 34 of the external storage 3A is used for enabling the optional function of the optional function software 17-1 and the second license key (1) corresponds to the first license key.

(Procedure)

First, when the external storage 3A is connected to the first camera 1 (step S1), a menu screen for urging the user to select optional function software to be enabled is displayed on the display unit 15. When the user performs an operation input to the operation unit 14 while looking at the menu screen and selects to enable an optional function, the function managing unit 18 performs processing for enabling the optional function (step S2). At this point, the external-storage recognizing unit 16 transmits the second license key for the optional function of the first camera 1 to the external storage 3A via the external-storage interface unit 19.

When the interface control unit 32 of the external storage 3A receives the second license key from the first camera 1 via the interface unit 31, the interface control unit 32 passes the received second license key to the authenticating unit 34. The authenticating unit 34 reads out the first license key of the external storage 3A, performs authentication concerning whether the second license key received from the first camera 1 coincides with the first license key (step S3), and confirms that the first license key corresponding to the transmitted second license key is present.

When the first and second license keys authenticated by the authenticating unit 34 coincide with each other, the authenticating unit 34 deletes the first license key (step S4). The interface control unit 32 permits communication between the interface unit 31 and the storing unit 33. The authenticating unit 34 notifies the first camera 1 that the authentication is successful. At this point, since data can be written in the storing unit 33, the first camera 1 can use the external storage 3A as a normal storage for which reading and writing of data are not limited.

The external-storage recognizing unit 16 of the first camera 1 instructs, in response to the notification of the success of the authentication from the external storage 3A, the function managing unit 18 to enable an optional function corresponding to the second license key. The function managing unit 18 enables the optional function of the optional function software 17-1 instructed to be enabled (step S5). Consequently, the executing unit 13 can execute the enabled optional function.

(Postconditions)

The first license key is deleted from the external storage 3A. The external storage 3A can be used as a normal storage. The user can freely read out data from and write data in the normal storage. Consequently, the first camera 1 can use the enabled optional function and still may be unable to use an optional function not enabled.

(Disabling an Optional Function)

FIG. 3 is a flowchart for explaining a processing example in disabling an optional function.

(Preconditions)

As a premise for this processing, it is assumed that the first license key for an optional function to be enabled is not stored in the external storage 3A.

(Procedure)

First, when the external storage 3A is connected to the first camera 1 (step S11), removing operation for disabling an optional function can be performed. When the removing operation is performed, the first camera 1 causes the display unit 15 to display a menu screen. When the user performs an operation input to the operation unit 14 while looking at the menu screen and selects to disable the optional function, the function managing unit 18 performs processing for disabling the optional function (step S12).

Subsequently, the function managing unit 18 of the first camera 1 disables the selected optional function (step S13).

The external-storage recognizing unit 16 transmits the first license key to the external storage 3A. The authenticating unit 34 of the external storage 3A adds the second, license key received from the first camera 1 to the authenticating unit 34 as the first license key (step S14). The interface control unit 32 prohibits communication between the interface unit 31 and the storing unit 33.

(Postconditions)

The first camera 1 may be unable to use the disabled optional function. Since the first license key corresponding to the disabled optional function is stored in the external storage 3A, the external storage 3A may be unable to be used as a normal storage. For example, even if the external storage 3A is connected to an information processing apparatus not having the second license key, the information processing apparatus may be unable to access the external storage 3A. Since an access to the external storage 3A is prohibited in this way, processing for reading out data from the storing unit 33 and formatting the storage area of the storing unit 33 may be unable to be performed either. Therefore, it is possible to conceal data.

When a function of software is disabled by the function managing unit 18, the external-storage recognizing unit 16 performs processing explained below. The external-storage recognizing unit 16 causes the external storage 3A to store, as the first license key, the second license key uniquely corresponding to an optional function to be disabled of optional function software. When the external storage 3A is connected to the second camera 2, the second camera 2 enables, on the basis of the second license key of the second camera 2, the optional function of the optional function software 17-1 in the second camera 2. Therefore, it is possible to perform control as if the optional function to be enabled is shifted from the first camera 1 to the second camera 2.

With the first camera 1 or the second camera 2 according to the first embodiment explained above, the optional function of the first camera 1 can be enabled or disabled after a function of managing the first license key for an optional function is given to the external storage 3A. The external storage 3A authenticates the second license key stored in the first camera 1 using the first license key and notifies the first camera 1 that the authentication is successful. According to the notification, the first camera 1 enables the optional function selected by the user. After the optional function is enabled, even if the external storage 3A is disconnected from the first camera 1, the first camera 1 can continue to use the optional function.

Since the external storage 3A authenticates the second license key on the basis of the first license key, the authenticating unit 34 deletes the first license key. Consequently, the first camera 1 and the second camera 2 can read out data from and write data in the storing unit 33 of the external storage 3A as well. Therefore, the external storage 3A from which the first license key is deleted can be used again as a storage for which readout and writing of data is possible without authentication by another information processing apparatus. Since the hard key formed in the special shape in the past does not need to be used as the external storage 3A, labor for, for example, sending the first camera 1 to an exclusive facility in order to enable an optional function is unnecessary. Further, since it is unnecessary to disassemble the first camera 1 in order to connect the hard key to the first camera 1, it is possible to reduce a risk of a failure of the first camera 1.

If a general-purpose product (e.g., a memory or a USB memory by Express Card (registered trademark)) or the like is used as the external storage 3A, it is unnecessary to manufacture an exclusive hard key and cost for using an optional function can be reduced. Further, if the external storage 3A is the general-purpose product, it is possible to select whether an optional function is enabled or disabled without connecting the hard key formed in the special shape in the past to the first camera 1. The information processing apparatus is not limited to the camera. It is possible to manage enabling and disabling of optional functions used in various kinds of information processing apparatuses.

When the first camera 1 is once authenticated, with the external storage 3A kept disconnected, the first camera 1 can keep enabling an optional function of optional function software already included in the first camera 1. Further, when the optional function enabled by the first camera 1 is enabled in the second camera 2 as well, the first camera 1 once disables the optional function. At this point, when the first camera 1 disables an optional function selected by the user, the first camera 1 writes the first license key for the relevant optional function in the external storage 3A. Consequently, the optional function is disabled by the first camera 1 and readout of data from and writing of data in the external storage 3A may be unable to be performed. Even if the external storage 3A is attached to an information processing apparatus not having the second license key other than the first camera 1, authentication of the first license key may be unable to be performed and readout from and writing in the storing unit 33 may be unable to be performed. Therefore, security against an unauthorized access is improved. On the other hand, if the external storage 3A is connected to the second camera 2 having the second license key and authentication is successful, shifting of the optional function from the first camera 1 to the second camera 2 can be easily performed.

In the external storage 3A, only the first license key for enabling one kind of an optional function can be stored. The first license keys for enabling plural optional functions may be unable to be simultaneously stored. Specifically, one external storage 3A and one optional function are associated in a one-to-one relation. Optional functions of plural information processing apparatuses may be unable to be simultaneously enabled using only one external storage 3A. Therefore, it is easy to perform license management.

2. Second Embodiment

A processing example in shifting an optional function of the first camera 1 and the second camera 2 according to a second embodiment of the present disclosure is explained with reference to FIG. 4. In the following explanation, components already explained in the first embodiment are denoted by the same reference numerals and signs and detailed explanation of the components is omitted.

In the information processing apparatus according to the first embodiment explained above, after the authentication concerning whether the first and second license keys coincide with each other is performed by the authenticating unit 34, an optional function is enabled to allow an access to the storing unit 33. On the other hand, in an information processing apparatus according to the second embodiment, the external storage 3A in which readout from and writing in the storing unit 33 can be performed only after a correct password or the like is input is used. Therefore, authentication itself performed by the authenticating unit 34 of the external storage 3A according to input of a password is not used for managing a license of an optional function.

In the information processing apparatus according to this embodiment, electronic data equivalent to the first license key is stored in the storing unit 33. The authenticating unit 34 prohibits readout of data from and writing of data in the external storage 3A performed by an information processing apparatus that does not input a correct password. Therefore, license information, which is used as a license key, is stored in the storing unit 33 as electronic data. After a correct password or the like is input and authentication is performed, the information processing apparatus can read out the electronic data from the storing unit 33. The electronic data may be a computer program. Plural electronic data may be stored in the storing unit 33.

[Moving an Optional Function Using Electronic Data]

(Preconditions)

FIG. 4 is a flowchart for explaining a processing example in shifting an optional function.

As a premise of processing, it is assumed that a first optional function is enabled in the first camera 1 and the first optional function is disabled in the second camera 2. Instead of the first and second license keys shown in FIGS. 2 and 3, special electronic data equivalent to the first and second license keys stored in the storing unit 33 is used. As the electronic data, besides a text, an image or the like may be used. It is assumed that the electronic data is stored in the first and second cameras 1 and 2 and the external storages 3A to 3C.

(Procedure)

When the external storage 3A is connected to the first camera 1 (step S21), the authenticating unit 34 requests input of a password and performs authentication of the first camera 1 (step S24). If a correct password is not input, the first camera 1 may be unable to access the storing unit 33 of the external storage 3A. When the correct password is input, the processing example in disabling the optional function explained with reference to FIG. 3 in the first embodiment is applied to the first camera 1 (steps S23 to S25). When the optional function of the first camera 1 is disabled, electronic data is stored in the external storage 3A.

When the external storage 3A is connected to the second camera 2 (step S26), the authenticating unit 34 requests input of a password and performs authentication of the second camera 2 (step S27). If the correct password is not input, the second camera 2 may be unable to access the storing unit 33 of the external storage 3A. When the correct password is input, the processing example in enabling the optional function explained with reference to FIG. 2 in the first embodiment is applied to the second camera 2 (steps S28 to S31). When the optional function of the second camera 2 is enabled, the electronic data is erased from the external storage 3A. The second camera 2 can read out data from and write data in the external storage 3A.

(Postconditions)

When the optional condition to be enabled is shifted from the first camera 1 to the second camera 2, the optional function is disabled in the first camera 1 and the optional function is enabled in the second camera 2.

In this way, when the authenticating unit 34 of the external storage 3A connected to the first camera 1 or the second camera 2 requests input of a password and the correct password is input, readout of data from and writing of data in the storing unit 33 of the external storage 3A can be performed. Therefore, the optional function to be enabled can be safely shifted from the first camera 1 to the second camera 2. When the function managing unit 18 disables a function of software, the external-storage recognizing unit 16 of the first camera 1 performs processing explained below. After the external storage 3A connected to the first camera 1 performs password authentication, the first camera 1 causes the storing unit 33 of the external storage 3A to store, as a license key, electronic data uniquely corresponding to an optional function to be disabled of optional function software. After the external storage 3A connected to the second camera 2 performs password authentication, the second camera 2 enables an optional function of optional function software in the second camera 2 on the basis of electronic data held by the second camera 2. Therefore, it is possible to perform control as if the optional function to be enabled is shifted from the first camera 1 to the second camera 2.

With the first camera 1 or the second camera 2 according to the second embodiment explained above, after the correct password is input and the password is authenticated, it is possible to read out data from and write data in the storing unit 33 of the external storage 3A. Therefore, an information processing apparatus incapable of inputting the correct password may be unable to access the storing unit 33. In the shifting of the optional function, when electronic data stored in the storing unit 33 of the external storage 3A is used and the first camera 1 performs authentication of the electronic data, the first camera 1 can enable the optional function and access the external storage 3A. When the external storage 3A is accessed, the external storage 3A deletes the electronic data from the storing unit 33. Therefore, an information processing apparatus capable of inputting the correct password other than the first camera 1 can function as a normal storage and read out data from and write data in the storing unit 33.

When it is desired to shift the optional function from the first camera 1 to the second camera 2, the first camera 1 disables the optional function of the first camera 1 and writes electronic data of the disabled optional function in the external storage 3A to prohibit an access of the first camera 1. Thereafter, the second camera 2 deletes the electronic data corresponding to the optional function from the external storage 3A and enables the optional function of the second camera 2 to permit an access of the second camera 2. Therefore, simply by reconnecting the external storage 3A from the first camera 1 to the second camera 2, it is possible to easily shift the optional function to be enabled.

3. Modifications

In the first and second embodiments, the example in which the card-type semiconductor storage is used as the external storages 3A to 3C is explained. However, an optical disk, a magnetic disk, or the like may be used or a hard disk drive (HDD), a tape, or the like may be used. Further, an external storage easily handled in various information processing apparatuses such as a flash memory conforming to the USB standard may be used.

In the first and second embodiments, the example in which the camera is used as the information processing apparatus is explained. However, a recording and reproducing apparatus or a personal computer apparatus that can perform recording or reproduction of a video or recording or reproduction of sound may be used.

Plural kinds of the second license keys may be associated with one kind of the first license key. Conversely, one kind of the second license key may be associated with plural kinds of the first license keys.

The series of processing in the embodiments can be executed by hardware. However, the series of processing can also be executed by software. When the series of processing is executed by the software, the series of processing can be executed by a computer in which a computer program configuring the software is incorporated in an exclusive hardware or a computer in which a computer program for executing various functions is installed. For example, a computer program configuring desired software only has to be installed in a general-purpose personal computer to cause the personal computer to execute the processing.

A recording medium having recorded therein a program code of software for realizing the functions of the embodiments may be supplied to a system or an apparatus. It goes without saying that a computer (or a control device such as a CPU) of the system or the apparatus reads out and executes the program code stored in the recording medium, whereby the functions are also realized.

As the recording medium for supplying the program code in this case, for example, a flexible disk, a hard disk, an optical disk, a magneto-optical disk, a CD-ROM, a CD-R, a magnetic tape, a nonvolatile memory card, or a ROM can be used.

The computer executes the read-out program code, whereby the functions of the embodiments are realized. In addition, an OS or the like running on the computer performs a part or all of actual processing on the basis of an instruction of the program code. The functions of the embodiments are also realized by the processing.

The present disclosure is not limited to the embodiments. It goes without saying that various other applications and modifications can be adopted without departing from the spirit of the present disclosure described in the appended claims.

The present disclosure can also adopt configurations explained below.

(1) An information processing apparatus including:
a software storing unit that stores software;
a storage recognizing unit that recognizes, when a storage having stored therein first authentication information for enabling a function of the software stored in the software storing unit is connected to the information processing apparatus via an interface unit, that the storage is connected and transmits second authentication information uniquely corresponding to the function of the software to be enabled to the storage; and
a function managing unit that enables, when the first authentication information and the second authentication information compared by the storage coincide with each other, the function of the software on the basis of a notification informing that the first authentication information and the second authentication information coincide with each other issued by the storage, the storage deleting the first authentication information.

(2) The information processing apparatus described in (1), further including an executing unit that executes the enabled function of the software, wherein
the storage performs control for deleting the first authentication information when the second authentication information received from the storage recognizing unit coincides with the first authentication information, disabling readout of data from and writing of data in a storage area when the first authentication information is stored in the storage, and enabling readout of the data from and writing of the data in the storage area when the first authentication information is deleted from the storage, and
the executing unit reads out the data from and writes the data in the storage from which the first authentication information is deleted.

(3) The information processing apparatus described in (1) or (2), wherein, when the function of the software enabled by the function managing unit is disabled, the storage recognizing unit causes the storage to store, as the first authentication information, the second authentication information uniquely corresponding to the disabled function of the software.

(4) The information processing apparatus described in any one of (1) to (3), wherein the software storing unit stores plural kinds of the software, and
the storage recognizing unit transmits the second authentication information of the software selected by an operation input to an operation unit to the storage.

(5) The information processing apparatus described in any one of (1) to (4), wherein the second authentication information is associated with the first authentication information stored in the storage in a one-to-one relation.

(6) An authentication method including:
recognizing, when a storage having stored therein first authentication information for enabling a function of software stored in a software storing unit is connected to an information processing apparatus via an interface unit, that the storage is connected and transmitting second authentication information uniquely corresponding to the function of the software to be enabled to the storage; and
enabling, when the first authentication information and the second authentication information compared by the storage coincide with each other, the function of the software on the basis of a notification informing that the first authentication information and the second authentication information coincide with each other issued by the storage, the storage deleting the first authentication information.

(7) A computer program for causing a computer to execute:
a procedure for recognizing, when a storage having stored therein first authentication information for enabling a function of software stored in a software storing unit is connected to an information processing apparatus via an interface unit, that the storage is connected and transmitting second authentication information uniquely corresponding to the function of the software to be enabled to the storage; and
a procedure for enabling, when the first authentication information and the second authentication information compared by the storage coincide with each other, the function of the software on the basis of a notification informing that the first authentication information and the second authentication information coincide with each other issued by the storage, the storage deleting the first authentication information.

The present disclosure contains subject matter related to that disclosed in Japanese Priority Patent Application JP 2011-086612 filed in the Japan Patent Office on Apr. 8, 2011, the entire contents of which are hereby incorporated by reference.

It, should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a software storing unit that stores software;
a storage recognizing unit that recognizes, when a storage having stored therein first authentication information for enabling a function of the software stored in the software storing unit is connected to the information processing apparatus via an interface unit, that the storage is connected and transmits to the storage second authentication information uniquely corresponding to the function of the software to be enabled, whereat the second authentication information is compared to the first authentication information; and
a function managing unit that receives notification from the storage that the first authentication information and the second authentication information coincide with each other and enables the function of the software stored in the software storing unit;

an executing unit that executes the enabled function of the software
wherein the first authentication information is deleted when the second authentication information coincides with the first authentication information,
wherein reading of data from and writing of data in the storage is disabled when the first authentication information is stored in the storage and is enabled when the first authentication information is deleted from the storage and
wherein the executing unit reads out the data from and writes the data in the storage from which the first authentication information is deleted.

2. The information processing apparatus according to claim 1, wherein, when the function of the software enabled by the function managing unit is disabled, the storage recognizing unit causes the storage to store, as the first authentication information, the second authentication information uniquely corresponding to the disabled function of the software, whereby the function of the software can be enabled in another apparatus to which the storage is connected.

3. The information processing apparatus according to claim 2, wherein
the software storing unit stores plural kinds of the software, and
the storage recognizing unit transmits the second authentication information of the software selected by an operation input to an operation unit to the storage.

4. The information processing apparatus according to claim 3, wherein the second authentication information is associated with the first authentication information stored in the storage in a one-to-one relation.

5. An authentication method comprising:
recognizing, when a storage having stored therein first authentication information for enabling a function of software stored in a software storing unit is connected to an information processing apparatus via an interface unit, that the storage is connected and transmitting to the storage second authentication information uniquely corresponding to the function of the software to be enabled;
comparing the second authentication information to the first authentication information;
receiving notification from the storage that the first authentication information and the second authentication information coincide with each other;
enabling, when the first authentication information and the second authentication information coincide with each other, the function of the software stored in the software storing unit;
executing the enabled function of the software;
deleting the first authentication information from the storage when the second authentication information coincides with the first authentication information; and
disabling reading of data from and writing of data in the storage when the first authentication information is stored in the storage and enabling reading of data from and writing of data in the storage when the first authentication information is deleted from the storage.

6. A non-transitory computer readable medium storing a computer program for causing a computer to execute:
a procedure for recognizing, when a storage having stored therein first authentication information for enabling a function of software stored in a software storing unit is connected to an information processing apparatus via an interface unit, that the storage is connected and transmitting to the storage second authentication information uniquely corresponding to the function of the software to be enabled;
a procedure for comparing the second authentication information to the first authentication information;
a procedure for receiving notification from the storage that the first authentication information and the second authentication information coincide with each other;
a procedure for enabling, when the first authentication information and the second authentication information coincide with each other, the function of the software stored in the software storing unit;
a procedure for executing the enabled function of the software;
deleting the first authentication information from the storage when the second authentication information coincides with the first authentication information; and
disabling reading of data from and writing of data in the storage when the first authentication information is stored in the storage and enabling reading of data from and writing of data in the storage when the first authentication information is deleted from the storage.

* * * * *